(12) United States Patent
Klenotiz

(10) Patent No.: US 8,104,431 B2
(45) Date of Patent: Jan. 31, 2012

(54) SELF-FILLING AND SELF-DRAINING WATERING DEVICE

(76) Inventor: Kenneth Klenotiz, Clinton, NY (US)

( * ) Notice: Subject to any disclaimer, the term of this patent is extended or adjusted under 35 U.S.C. 154(b) by 290 days.

(21) Appl. No.: 12/354,472

(22) Filed: Jan. 15, 2009

(65) Prior Publication Data

US 2010/0175625 A1 Jul. 15, 2010

(51) Int. Cl.
*A01K 7/00* (2006.01)
(52) U.S. Cl. ............... 119/72; 119/74; 119/75
(58) Field of Classification Search ........... 119/74, 119/72, 75, 51.5, 77, 78, 73, 475; 239/63, 239/67, 71, 16, 24, 28
See application file for complete search history.

(56) References Cited

U.S. PATENT DOCUMENTS

| | | | |
|---|---|---|---|
| 1,228,224 A | 5/1917 | Luke et al. | |
| 3,306,263 A * | 2/1967 | Johnson | 119/73 |
| 3,381,667 A * | 5/1968 | Martin | 119/75 |
| 3,759,228 A | 9/1973 | Keen | |
| 3,831,558 A | 8/1974 | Forbes | |
| 4,469,049 A | 9/1984 | Waynick | |
| 4,729,414 A | 3/1988 | Beber | |
| 4,872,485 A * | 10/1989 | Laverty, Jr. | 137/624.11 |
| 4,924,812 A | 5/1990 | Bernays, Jr. | |
| 4,986,221 A | 1/1991 | Shaw | |
| 5,009,192 A | 4/1991 | Burman | |
| 5,060,323 A | 10/1991 | Shaw | |
| 5,199,118 A | 4/1993 | Cole et al. | |
| 5,582,132 A | 12/1996 | Morton | |
| 5,782,202 A * | 7/1998 | Strickland | 119/78 |
| 5,813,363 A * | 9/1998 | Snelling | 119/73 |
| 5,934,221 A | 8/1999 | Kirschner | |
| 6,145,473 A | 11/2000 | Keisner | |
| 6,202,594 B1 | 3/2001 | Kirschner | |
| 6,250,601 B1 | 6/2001 | Kolar et al. | |
| 6,279,508 B1 | 8/2001 | Marchant et al. | |
| 6,460,483 B1 | 10/2002 | Northrop et al. | |
| 6,463,880 B1 * | 10/2002 | Callingham | 119/78 |
| 6,526,916 B1 | 3/2003 | Perlsweig | |
| 6,637,370 B1 | 10/2003 | Thorsen | |

(Continued)

OTHER PUBLICATIONS

Blitz Auto-Wata Automatic Water Bowl. [online]. 1 page. (Product information page) Petsmart. [retrieved on Feb. 19, 2008]. Retrieved from the Internet:< URL: http://www.petsmart.com/product/index.jsp?productId=2753800>.

(Continued)

*Primary Examiner* — Andrea Valenti
(74) *Attorney, Agent, or Firm* — Schmeiser, Olsen & Watts, LLP (57) ABSTRACT

The invention relates generally to a self-filling and self-draining watering device. The invention discloses an apparatus comprising a first compartment containing a bowl accepting fluid from an inlet opening, the fluid being continuously drained from the bowl, a second compartment, proximate the bowl, housing a reservoir proximate the bowl which temporarily retains continuously drained fluid, a pump actuated by a float switch to discharge fluid from reservoir, and a sensor detecting a movement, triggering a flow of fluid into the bowl. Additionally, the invention discloses a method comprising providing an apparatus having a first compartment and a reservoir, connecting the inlet supply line to an inlet line which transports fluid into the bowl, continuously draining the fluid into the reservoir, discharging fluid from the reservoir with a pump, providing a sensor to activate a solenoid valve to allow fluid into the bowl, and enclosing the bowl and reservoir in an outer shell.

25 Claims, 12 Drawing Sheets

U.S. PATENT DOCUMENTS

| | | |
|---|---|---|
| 6,758,166 B2 | 7/2004 | Eugene Squire |
| 6,996,863 B2 | 2/2006 | Kaneko |
| 7,069,941 B2 | 7/2006 | Parsons et al. |
| 7,152,550 B2 * | 12/2006 | Walker .......................... 119/51.5 |
| 7,267,078 B2 | 9/2007 | Palett et al. |
| 7,281,494 B1 | 10/2007 | Connerley |
| 7,430,988 B2 * | 10/2008 | Perlsweig et al. ............... 119/75 |
| 7,762,211 B1 * | 7/2010 | McDaniel ..................... 119/51.5 |
| 2006/0288947 A1 | 12/2006 | Perlsweig et al. |
| 2007/0095297 A1 | 5/2007 | Boyd |
| 2008/0035241 A1 | 2/2008 | Wittbold |
| 2008/0190374 A1 * | 8/2008 | Farris .............................. 119/74 |

OTHER PUBLICATIONS

Contech Water Dog—Motion Activated Outdoor Pet Fountain. [online]. 1 page. (Product information page) Petsmart. [retrieved on Feb. 19, 2008]. Retrieved from the Internet:< URL: http://www.petsmart.com/product/index.jsp?productId=2755376&cp=2767032.2767070&f...>.

Drinkwell Big-Dog Water Fountain. [online]. 1 page. (Product information page) Petsmart. [retrieved on Feb. 19, 2008]. Retrieved from the Internet:< URL: http://www.petsmart.com/product/index.jsp?productId=2754462&cp=2767032.2767070&f...>.

* cited by examiner

SELF-FILLING AND SELF-DRAINING WATERING DEVICE

BACKGROUND OF THE INVENTION

1. Field of the Invention

The present invention relates generally to an apparatus and method for a self-filling and self-draining watering device, and in particular a water bowl for pets. In addition, the present invention relates to a method of an animal providing water for itself.

2. Related Art

Many people consider pets a part of their family. Pet owners spend a lot of time caring for their pet, such as walking them, washing them, feeding them, playing with them, and generally caring for them. Pets require a lot of attention and care, but often times the owner is not present to constantly look after his or her pet. For example, a pet must sometimes wait alone at home while its owner leaves to go to work for hours at a time. While the owner is away, the pet may require or desire water, and the pet cannot provide water for itself unless nearby a lake, river, or some other accessible water source. Therefore, the pet may be deprived of water while the owner is not present, without any ability to find water. Even if the owner is present, the owner may forget to fill up the pet's water bowl, and the pet may go without water. Additionally, constantly filling up a pet's water bowl may become a nuisance, and keeping up with the pet's demand can become burdensome on pet owners, especially pet owners who lead busy lives.

Thus, there is a need for a water bowl that can fill itself with water whenever the pet approaches the bowl, whether or not its owner is present, alleviating the nuisance of constantly filling the pet's water bowl, and keeping up with the pet's demand for water consumption.

SUMMARY OF THE INVENTION

A first aspect of the present invention provides an apparatus comprising: a first compartment having a bowl accepting a fluid from an inlet opening, wherein said fluid is continuously drained from said bowl; a second compartment proximate said first compartment housing a reservoir temporarily retaining said continuously drained fluid, a pump to facilitate movement of said retained fluid through a drain line, and a float switch set to actuate said pump; and a sensor detecting a presence, wherein said presence detected by said sensor triggers a flow of said fluid to enter said bowl.

A second aspect of the present invention provides an apparatus comprising: an outer shell encompassing a bowl and a reservoir proximate said bowl, said bowl having a recessed area to accommodate a fluid flowing into said bowl through an inlet opening from an inlet line connected to an at least one solenoid valve to control a flow of said fluid into said bowl, said fluid being continuously drained into said reservoir through at least one drain opening positioned somewhere on a surface of said bowl, wherein said fluid is dispersed through an outlet positioned somewhere on a surface of said reservoir; an inlet supply line configured to connect to a fluid supply to introduce said fluid into said bowl through said inlet line; a pump in operable communication with said reservoir to facilitate discharge of said fluid; a sensor mounted on said outer shell that triggers a transistor switch to activate said at least one solenoid valve to allow the flow of said fluid from said fluid supply; a float switch in communication with said pump to discharge said fluid through a drain line connected to said pump; a outlet line connected to said drain line to carry said fluid from said reservoir to a final discharge point; a safety bin located proximate said bowl, wherein an at least one safety opening allows said fluid to flow into said safety bin, said safety bin housing a safety float device switch; and a sealed module located within the outer shell, containing a plurality of electric wires and at least one power cord, said sealed module receiving power from a power source.

A third aspect of the present invention provides a method of an animal providing water for itself comprising: providing an apparatus having a first compartment and a reservoir, said first compartment houses a bowl, an at least solenoid valve, a sealed electronics module, and an inlet line, said reservoir in communication with a pump and operable with a float switch, wherein said float switch actuates said pump to discharge said fluid out of said reservoir; attaching an inlet supply line to a fluid supply; connecting said inlet supply line to an inlet line which transports said fluid through an inlet opening to enter said bowl; draining said fluid continuously through an at least one drain opening located on a surface of said bowl into said reservoir; discharging said fluid from said reservoir, wherein said pump facilitates discharge of said fluid through a drain line; providing a sensor to activate at least one solenoid valve to allow a flow of said fluid into said bowl; activating an inlet supply when an animal triggers said sensor; providing a connection to a powering device; and enclosing said bowl and said reservoir in an outer shell.

BRIEF DESCRIPTION OF THE DRAWINGS

Some of the embodiments of this invention will be described in detail, with reference to the following figures, wherein like designations denote like members wherein.

DETAILED DESCRIPTION OF THE DRAWINGS

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

Figure 1:
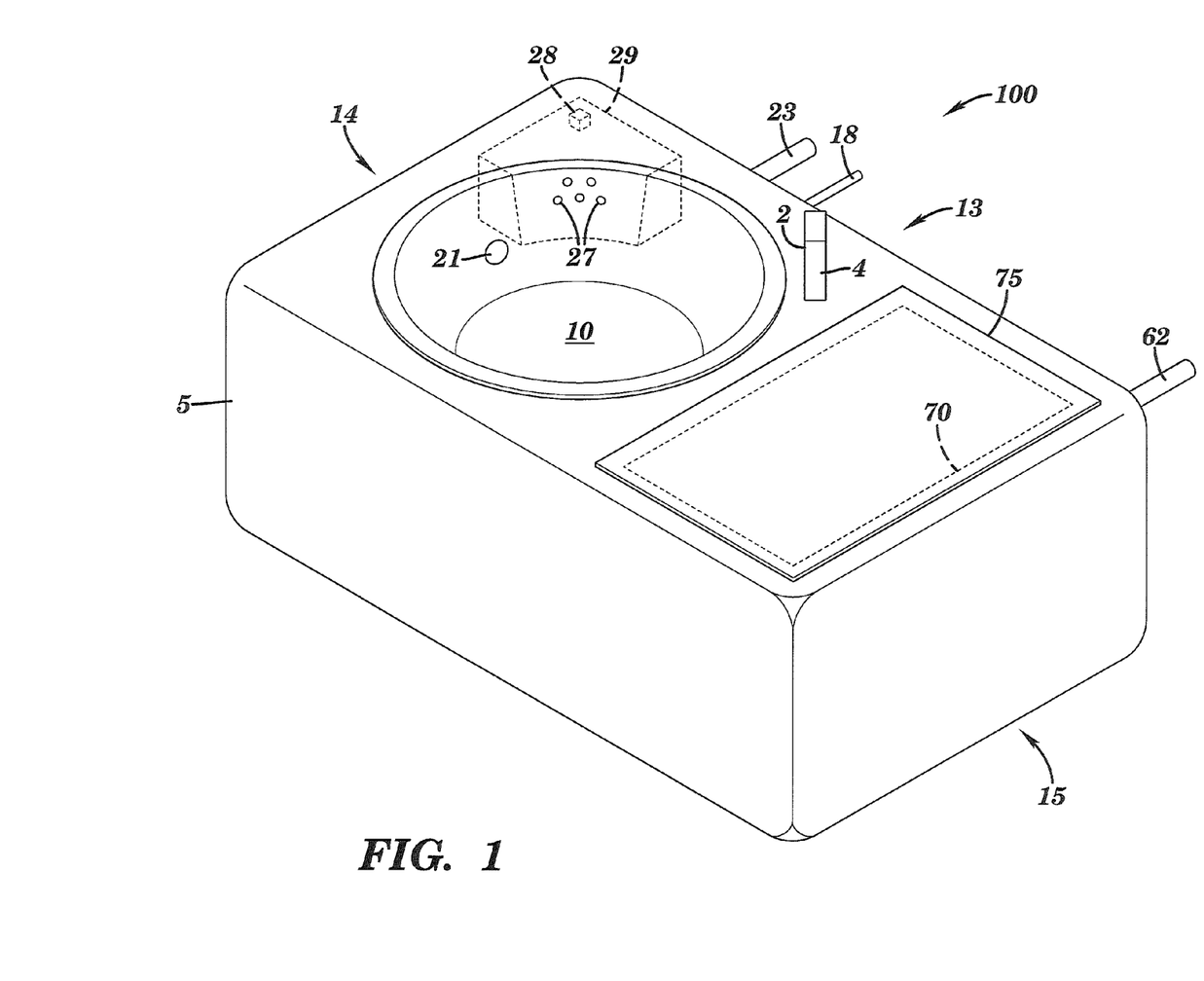
FIG. 1—depicts an isometric view of an embodiment of a watering device.
Figure 15:
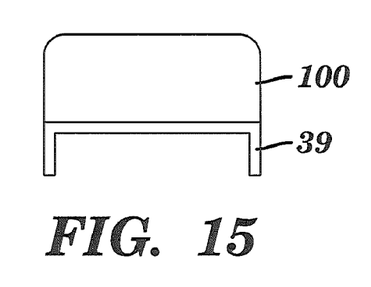
FIG. 15—depicts a schematic view of an embodiment of a watering device on a stand.

FIG. 1 depicts a view of an embodiment of a self-filling and self-draining watering device 100 for animals. The watering device 100 may be used in connection with different species of animals, including but not limited to dogs, cats, ferrets, rabbits, horses, and any animal that would approach the watering device 100 looking for water and trigger a sensor 2. One exemplary embodiment of the watering device 100 may be used in connection with a pet dog. The watering device 100 may be constructed to accommodate any and all sizes of animals (e.g. dogs). For example, the outer shell 5 may have higher and wider dimensions for a larger breed of dog (e.g. German Sheppard) and may have shorter and narrower dimensions for a smaller breed of dog (e.g. Yorkshire Terrier). The self-filling, self-draining watering device 100 may be comprised of fiberglass, plastic, composite material, stainless steel, or any other suitable material known to one having skill in the art. Additionally, the overall shape of the watering device 100 may vary. In one embodiment of the watering device 100, the shape may be a rectangular shape. In another embodiment, the water device 100 may have squared edges. In yet another embodiment, the watering device 100 may have a curvilinear shape, and also may have contoured sides and edges. The height of the watering device may also be extended by providing a stand 39, which may consist of one solid platform, or may consist of two to four legs. The stand 39 may be fastened to the watering device 100 or it may simply support the watering device 100 without being fastened or mounted to the watering device 100. An embodiment of the watering device 100 positioned on top of the stand 39 is shown in FIG. 15.

Figure 2:
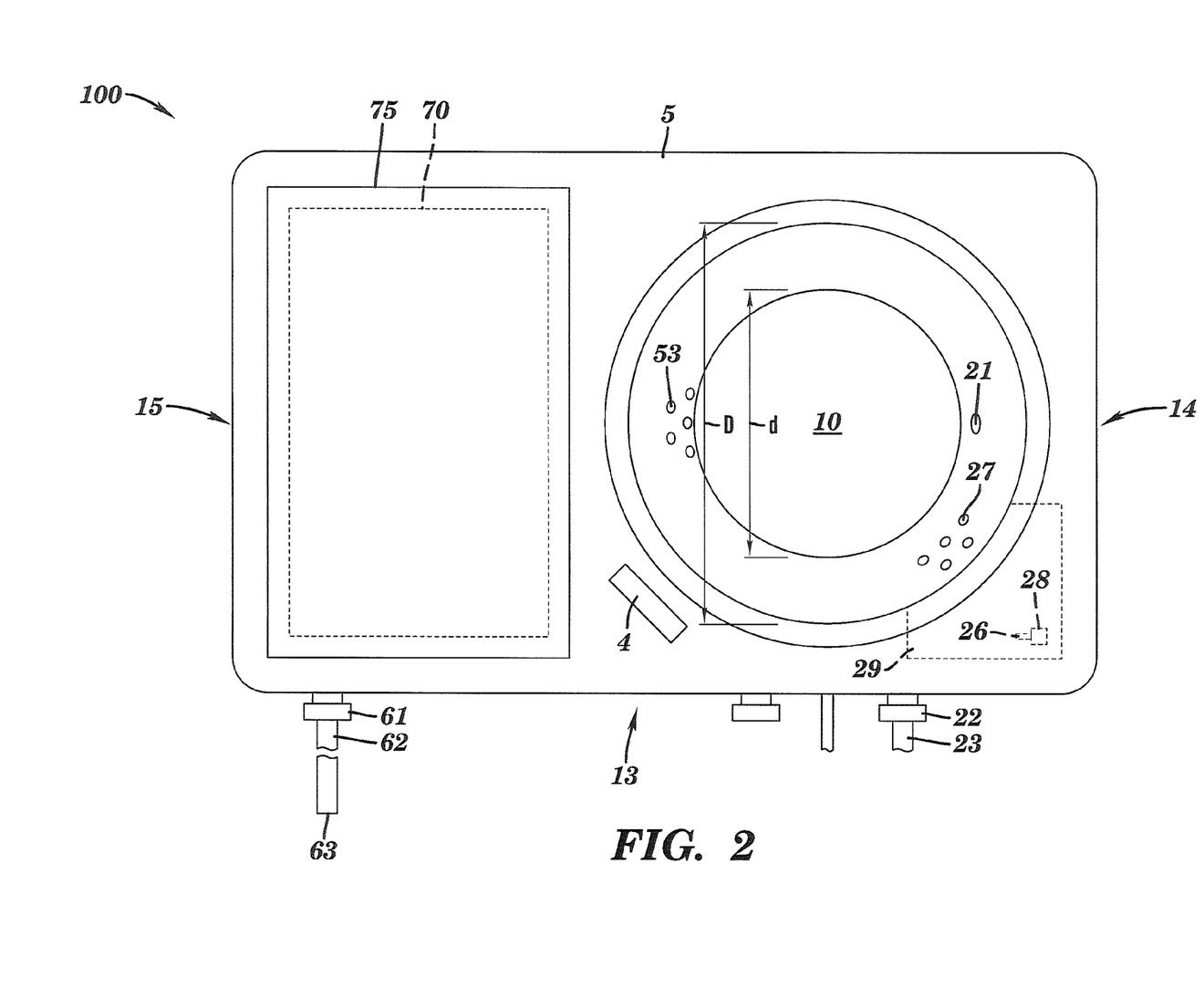
FIG. 2—depicts a top view of an embodiment of a watering device.

Further depicted in FIG. 1 is an embodiment of the bowl 10. The bowl 10 may have a recessed area which may be freely accessible. The shape of the bowl 10 may be cylindrical or rectangular. The sides of the bowl 10 may be sloped such that the diameter, D, of the bowl 10 at the surface of the outer shell 5 is larger than the diameter, d, of the bowl 10 at the bottom surface of the bowl 10. The difference between diameter D and diameter d is shown in FIG. 2. The bowl 10 may also have straight edges. Positioned somewhere on the inner surface of the bowl 10 is an inlet opening 21. The inlet opening 21 may allow a fluid to pass through it and enter the bowl 10. The inlet opening 21 may be, inter alia, circular holes, slots, or aperture in the inner surface of the bowl 10. The bowl 10 may also have more than one inlet opening 21 to allow more fluid to enter the bowl 10 at a given time. Across from the inlet opening 21 may be at least one drain opening 53 (shown FIG. 2). In one embodiment, the bowl 10 may have one drain opening 53. In another embodiment, the bowl 10 may have multiple drain openings 53. The drain openings 53 may be, inter alia, circular holes, slots, or aperture in the inner surface of the bowl 10. When the fluid enters the bowl 10, it may be continuously drained through the drain openings 53 into the reservoir 70, which may be located proximate the bowl 10. The reservoir 70 may be covered by a lid cover 75. The lid cover 75 may be a snapped into place, or may be removably fastened with screws, or any fastening means known to those having skill in the art. Proximate the inlet opening 21 located on the inner surface of the bowl 10, at least one safety opening 27 may also be positioned on the inner surface of the bowl 10. In one embodiment, the bowl 10 may have one safety opening 27. In another embodiment, the bowl 10 may have multiple safety openings 27. The safety openings 27 may be placed at a location on the surface of the bowl 10 which is higher, or closer to the surface of the outer shell 5, than both the inlet opening 21 and the drain openings 53. An outer shell 5 may encompass the bowl 10 and the reservoir 70 to form the structure of the watering device 100. The shape of the outer shell 5 may vary according to a desired shape, consistent with the shapes of the water device 100. The outer shell 5 may consist of one uniform shell, or may be made up of more than one piece that may be joined together to form an outer shell 5.

Figure 12:
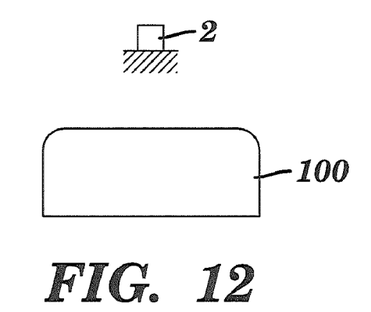
FIG. 12—depicts a schematic view of an embodiment of a watering device with a remote sensor.
Figure 16:
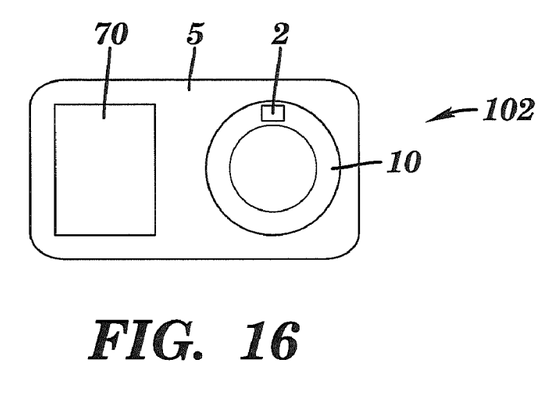
FIG. 16—depicts a top view of an embodiment of a watering device with a sensor incorporated within the bowl.

Mounted somewhere on the surface of the outer shell 5 may be a sensor 2. The sensor 2 may face the bowl 10 when mounted on the outer shell 5. Additionally, the sensor may face the bowl 10 at a slight downward angle to assist in detecting movement or presence near the bowl 10. The sensor 2 may detect movement or presence near the watering device 100 which may trigger a transistor switch to activate at least one solenoid valve 40 to allow the flow of fluid from a fluid supply to enter the bowl 10. For example, as a pet approaches the watering device 100, the pet's movement or presence may be detected by the sensor 2, which may trigger a transistor switch to activate the solenoid valve 40 (shown FIG. 3) to allow the flow of water into the bowl 10. This process may occur instantaneously, such that as soon as a pet's movement or presence is detected, fluid may enter the bowl 10. The sensor 2 may detect movement or the presence of an animal within a range of 0" to 15" (approximately 15"). In an exemplary embodiment, the sensor 2 may detect movement within 8" of the bowl 10. Detecting distances at a greater distance might result in unwanted activations of the solenoid valve 40, and unwanted and unnecessary flow of fluid into the bowl 10. As previously mentioned, the sensor 2 may be mounted on the surface of the outer shell 5, facing the bowl 10, but may also be incorporated into the bowl 10 as shown in FIG. 16. In another embodiment, the sensor 2 may be remotely mounted as shown in FIG. 12. The sensor 2 may be any shape, including but not limited to a square, rectangle, circle, oval, or any other functional shape. To avoid water damage from occasional splashes and drool from a pet's mouth, the sensor 2 may be housed or covered by a water tight cover 4. The water tight cover 4 may be any shape, and may correspond to the same shape of the sensor 2. Furthermore, the sensor 2 may employ different sensory technology as known to those having skill in the art. In one exemplary embodiment, the sensor 2 may be an infrared reflective sensor. In another embodiment, the sensor 2 may be a sensor that employs infrared through beam technology. In yet another embodiment, the sensor 2 may be employ ultrasonic technology.

FIG. 2 depicts one embodiment of the positioning of the components of the watering device 100. In the embodiment shown in FIG. 2, the bowl 10 is next to the reservoir 70, that otherwise may be referred to as side-by side the reservoir 70. However, the bowl 10 need not be side-by side the reservoir 70, but may also be located directly or partially above the reservoir 70. In a side-by-side configuration, the inlet supply line 23 may be located on the same side of the watering device 100 as the bowl 10. Likewise, the outlet line 63 may be located on the same side of the watering device 100 as the reservoir 70. In any configuration of the bowl 10 and the reservoir 70, such as the bowl 10 located partially above the reservoir 70, the inlet supply line 23 and the outlet line 63 may be redirected or repositioned to enter and exit the watering device 100 without affecting the operation of the watering device 100. Furthermore, in a side-by-side configuration, the bowl 10 may protrude downward approximately ½ the height of the watering device 100.

The sensor 2 may be located anywhere on the line end 13 of the watering device 100 behind the bowl 10, wherein the line end 13 of the watering device 100 is the side which the inlet supply line 23 enters the watering device 100 and the outlet line 62 exits the watering device 100. Thus, in FIG. 2, the sensor 2 is located behind the bowl 10 on the first compartment 14 of the line end 13. Locating the sensor 2 behind the bowl 10, and facing the inner surface of the bowl 10, on the line end 13 of the watering device 100 may result in an easier path to the watering device because the inlet supply line 23 and outlet line 62 would be on the opposite side. For example, a pet approaching the watering device 100 with the sensor 2 located as shown in FIG. 2 may not likely accidentally dislodge the outlet line 62 or the inlet supply line 23, or damage them because they would not be in the way. However, the watering device 100 may still properly function if the sensor 2 was located on the opposite side of the bowl 10.

Figure 3:
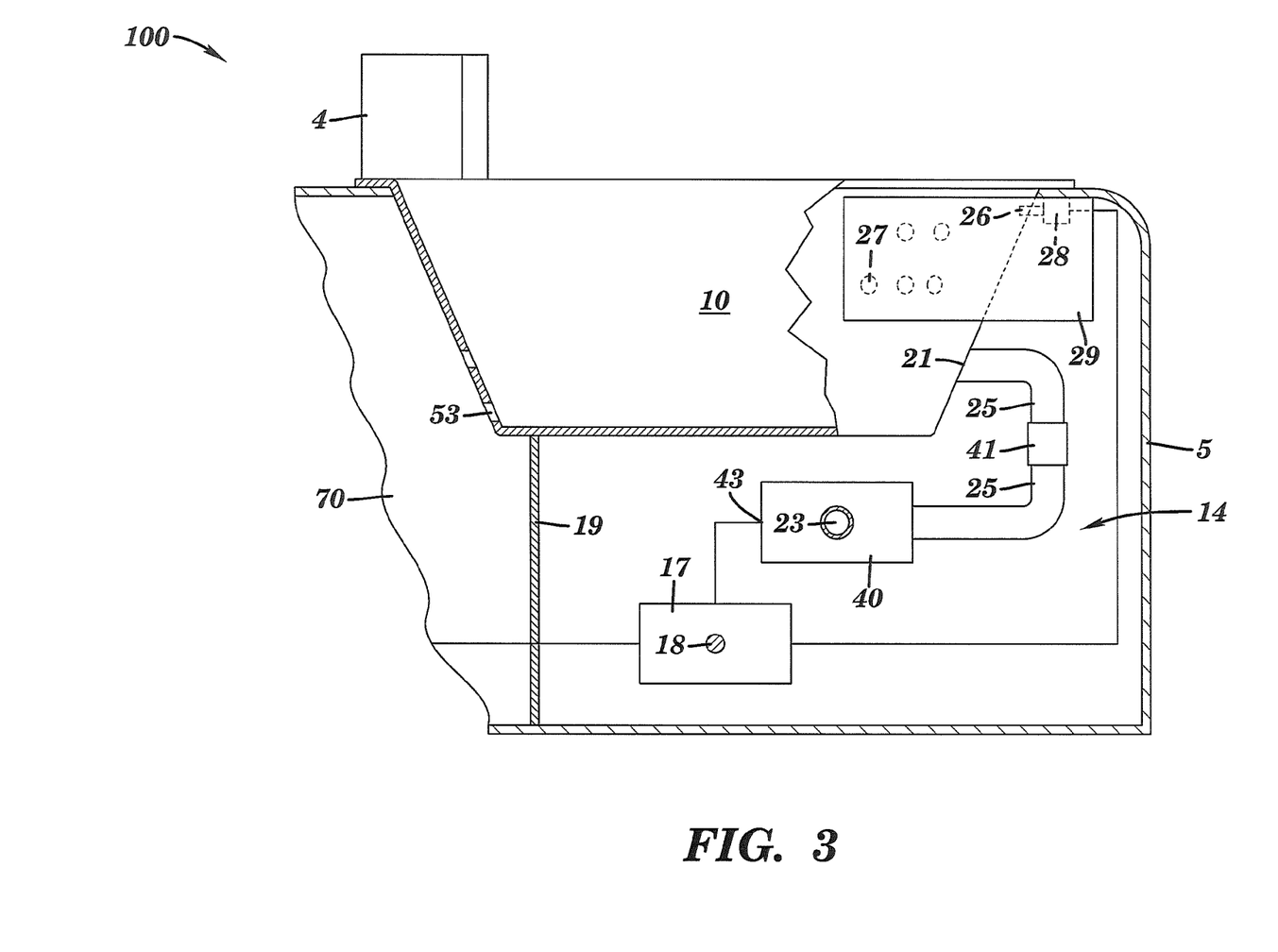
FIG. 3—depicts a cross-sectional view, line end of an embodiment of a first compartment of a watering device.

FIG. 3 depicts an embodiment of the watering device 100, and in particular the first compartment 14 of the watering device 100. The watering device 100 may receive its supply of fluid from an external source, such as a domestic water pipeline. One end of the inlet supply line 23 may be attached or connected to an external supply of fluid to transport or carry the fluid to the watering device 100. An inlet supply line 23 may be made of collapsible material or a rigid material. The opposite or distal end of the inlet supply line 23 which is not attached to a fluid supply is connected to an inlet line 25. The connection between the inlet supply line 23 and the inlet line 25 may occur at or near the external surface of the outer shell 5. Connecting the inlet supply line 23 to the inlet line 25 may be an in-line check valve 22. The in-line check valve 22 may prevent backflow into the fluid supply. Furthermore, the inlet supply line 23 and inlet line 25 may be connected to the line end 13 of the watering device 100 with quick valve connectors, which may allow quick and easy removal of the inlet supply line 23 from the watering device 100. For example, if a pet owner wishes to clean the watering device, the inlet supply line 23 may quickly detach from the watering device 100 without spillage occurring because the inlet line 25 may be equipped with quick valve connectors. The outlet line 62 may be constructed the same way. In another embodiment, the inlet supply line 23 and outlet line 62 may be connected to the line end 13 of the watering device 100 using standard barbed fittings with hoses clamped on or a length of permanently attached line exiting the watering device 100 with an in-line valve quick connect fittings. The inlet supply line 23 and outlet line 62 may be made of vinyl, polypropylene, copper, pex or any suitable material known to those in the art. In addition, the inlet supply line 23 and outlet line 63 may be left unprotected or protected with various coverings known to those in the art to prevent any chewing by a pet.

The inlet line 25 may then connect to an at least one solenoid valve 40. The watering device may function with only one solenoid valve 40, or may function with more than one solenoid valves 40. The solenoid valve may impede the flow of water from the inlet line 25 until the solenoid valve 40 receives a signal from the transistor switch activated by the movement detected by the sensor 2. Through the conventional operation of a solenoid valve, once the solenoid valve 40 is opened, the flow of water may continue up through the inlet line 25 and through an inlet opening 21. In one embodiment, the portion of inlet line 25 between the solenoid valve 40 and the inlet opening 21 may be equipped with an inlet line clamp 41 to prevent kinking. The solenoid valve 40 may have a power connection 43 located somewhere on the solenoid valve 40. The solenoid valve 40 may be mounted directly to the bottom of the bowl 10. Also, the solenoid valve 40 could be mounted to a separate piece which may be mounted to the bowl 10.

Figure 4:
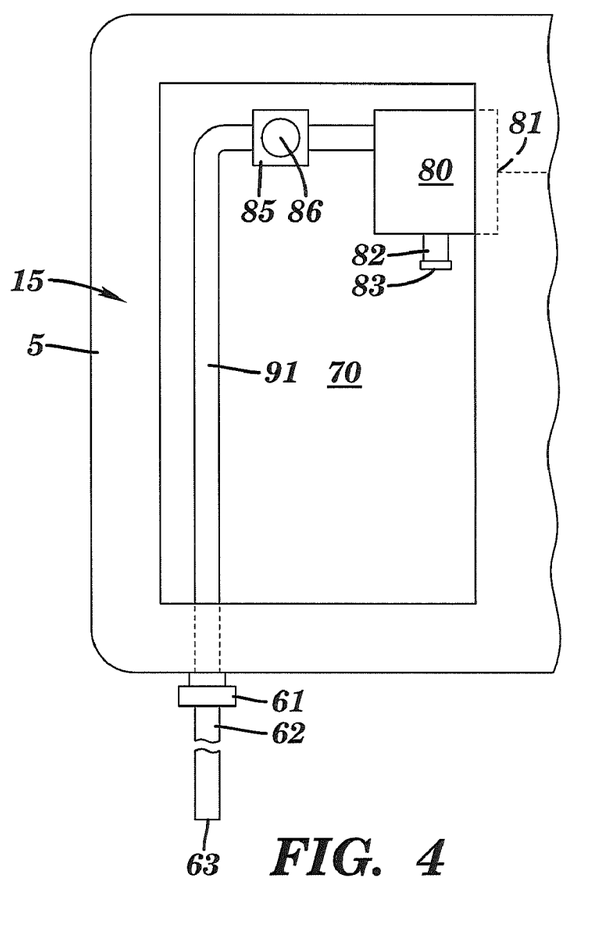
FIG. 4—depicts a top view of an embodiment of a second compartment of a watering device with the reservoir lid cover removed.
Figure 8:
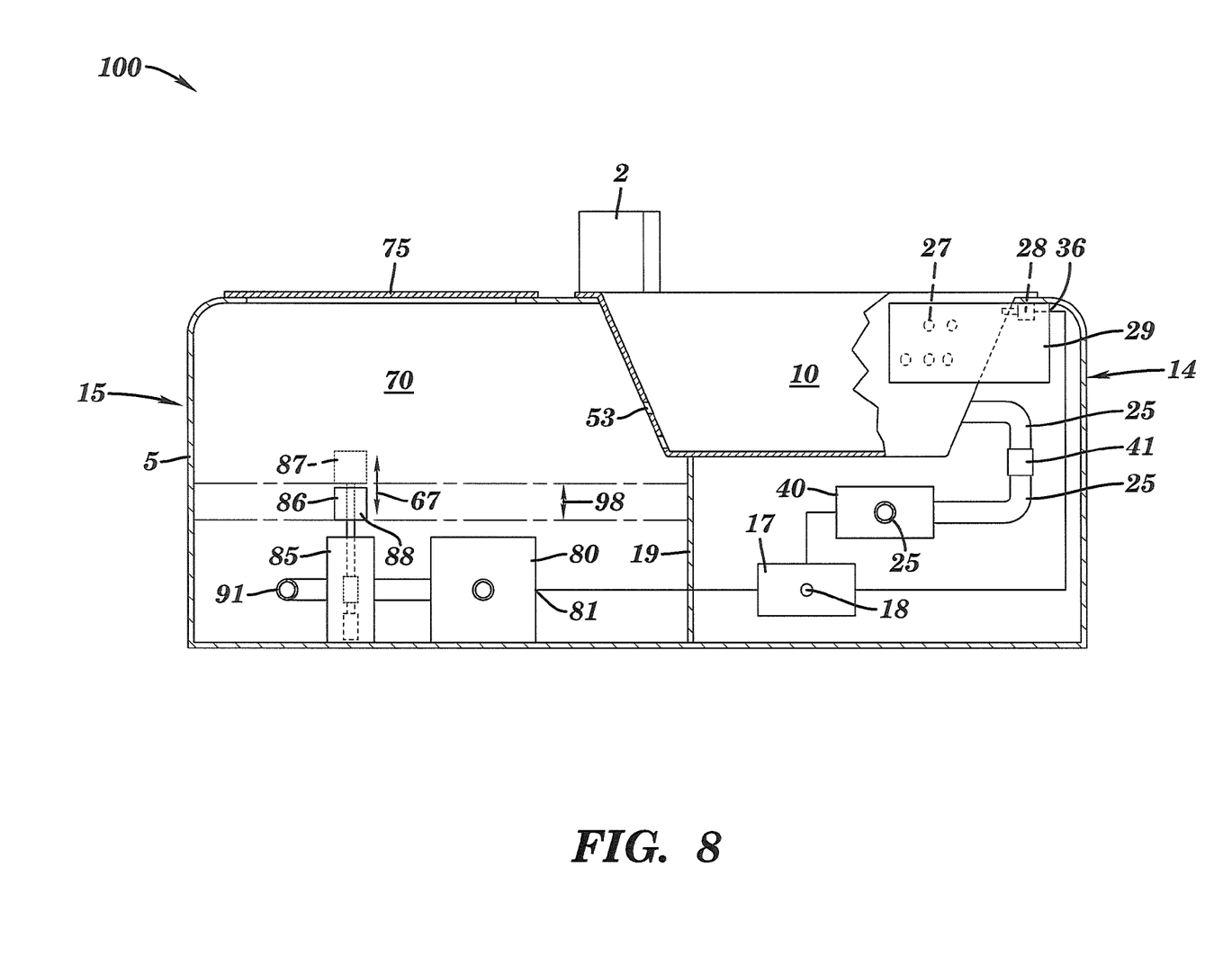
FIG. 8—depicts a cross sectional view, line end of an embodiment of a watering device.

FIG. 4 depicts an embodiment of the watering device 100, and in particular the second compartment 15 of the watering device, herein referred to as the reservoir 70 side. The reservoir 70 may be concealed with a lid cover 75, but the reservoir areas may be accessible for cleaning or maintenance. In one embodiment, the lid cover 75 may be recessed to accommodate food, or a fluid. Located within the reservoir may be a pump 80, a float switch 85, and a drain line 91. The pump may discharge the fluid that enters the reservoir 70 through the drain openings 53. The pump 80 may have a pump intake 82 attached to the front of the pump 80 to intake the fluid retained in the reservoir 70. Additionally, the pump intake 82 may have a screening device 83 configured to fit inside the diameter of the pump intake 82. The screening device 83 may prevent debris or other unwanted material from entering the pump 80. The pump 80 may be mounted to the bottom surface of the reservoir 70. The pump 80 may also be mounted at a slight acute angle ranging from 0° to 45° from the bottom surface of the reservoir 70 to increase efficiency in intaking water deposited into the reservoir 70. In an exemplary embodiment, the pump may be mounted at a 10° angle. The pump may be in communication with the float switch 85. The float switch 85 may have an arm that outwardly extends a distance towards the middle of the reservoir 70. In another embodiment, the float switch 85 may be vertical and not extend towards the center of the reservoir 70. At the distal end of the float switch 85, may be a float switch tip 86. The float switch tip 86 may rest in a first position 88, which does not contact enough fluid to engage the float switch tip 86. In the first position 88, the pump may not be in operation. Also, in the first position 88, the water level 96 in the reservoir may be at a level that may not cause any flooding, and the components may be idle. When the water level rises in the reservoir, the float switch tip 86 may be contacted by the water level, and when the water level continues to rise, the float switch tip 86 may be pushed upwards along with the water level. Once the float switch tip 86 is pushed upwards by the rising water level 97 to a second, engaged position 87, the float switch 85 may actuate the pump 80, and the pump 80 commences in discharging the water out of the reservoir 70. The change in water level 98 to actuate the pump, as shown in FIG. 8, may be caused by water entering the reservoir 70 through the drain openings 53 from continued use by a pet.

Attached to the pump 80, is the drain line 91. When the pump 80 is actuated by the float switch 85, the pump intakes water through the pump intake 82, and then through conventional operation of a pump, water may be pumped through the drain line 91. The drain line 91 may extend to the outer shell 5, and may be connected to the outlet line 62 via an in-line check valve 61 to prevent backflow. Backflow may be a serious concern if the final discharge point 63 is sewage or sanitary plumbing lines. As the water or fluid is carried through the drain line 91 via the pump 80, the water level 97 may subside to a water level at or below water level 96, wherein the float switch tip 86 may return to the first position 88 (i.e. the float switch tip is not engaged or in contact with the water in the reservoir 70). Once the fluid enters the outlet line 62 via the drain line 91, the fluid or water may then be carried to a final discharge point 63. The final discharge point 63 may be to, inter alia, a main plumbing system, a basement sump pit, household sanitary drain lines, or anywhere located outdoors. In one embodiment, the final discharge point 63 may consist of running the outlet line 62 up onto the counter top and discharging the water over the rim of the counter top and into the sink of a kitchen or bathroom. In another embodiment, the outlet line 62 may be connected several different ways to the trap under the sink or into a garbage disposal. In another embodiment, the final discharge point 63 may be a dishwasher drain line. In yet another embodiment, the final discharge point 63 may be connected to a clothes washer drain stand pipe. In an additional embodiment, the final discharge point 63 may be outdoors, and discharge onto land. For example, the fluid exiting the watering device 100 from the outlet line 62 may be discharged onto an owner's lawn, especially if the watering device 100 is located outdoors. Regardless of the final discharge point 63, the outlet line 62 may extend to wherever fluid can be safely and/or sensibly discharged.

Figure 5:
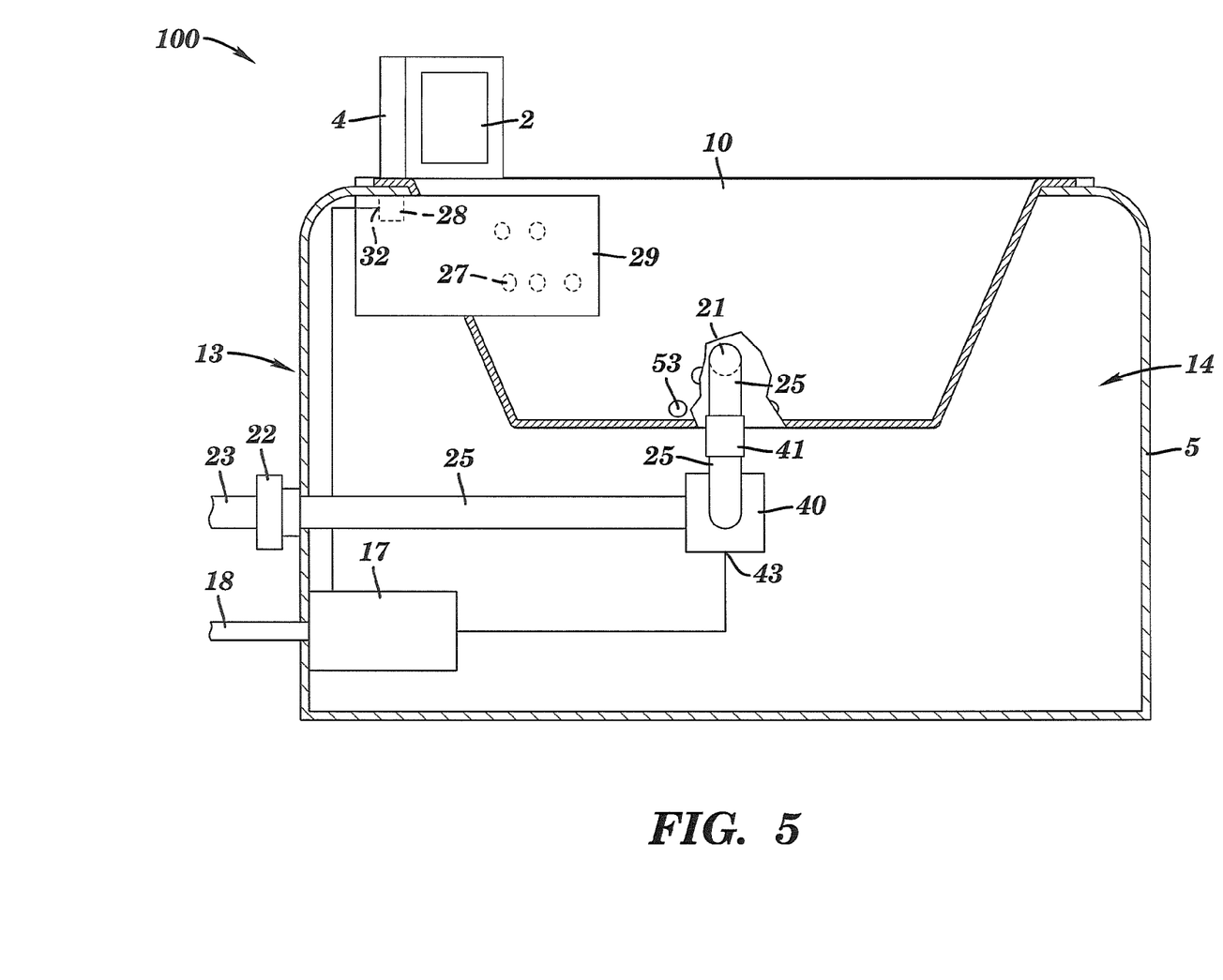
FIG. 5—depicts a side view of an embodiment of a watering device from the first compartment.
Figure 6:
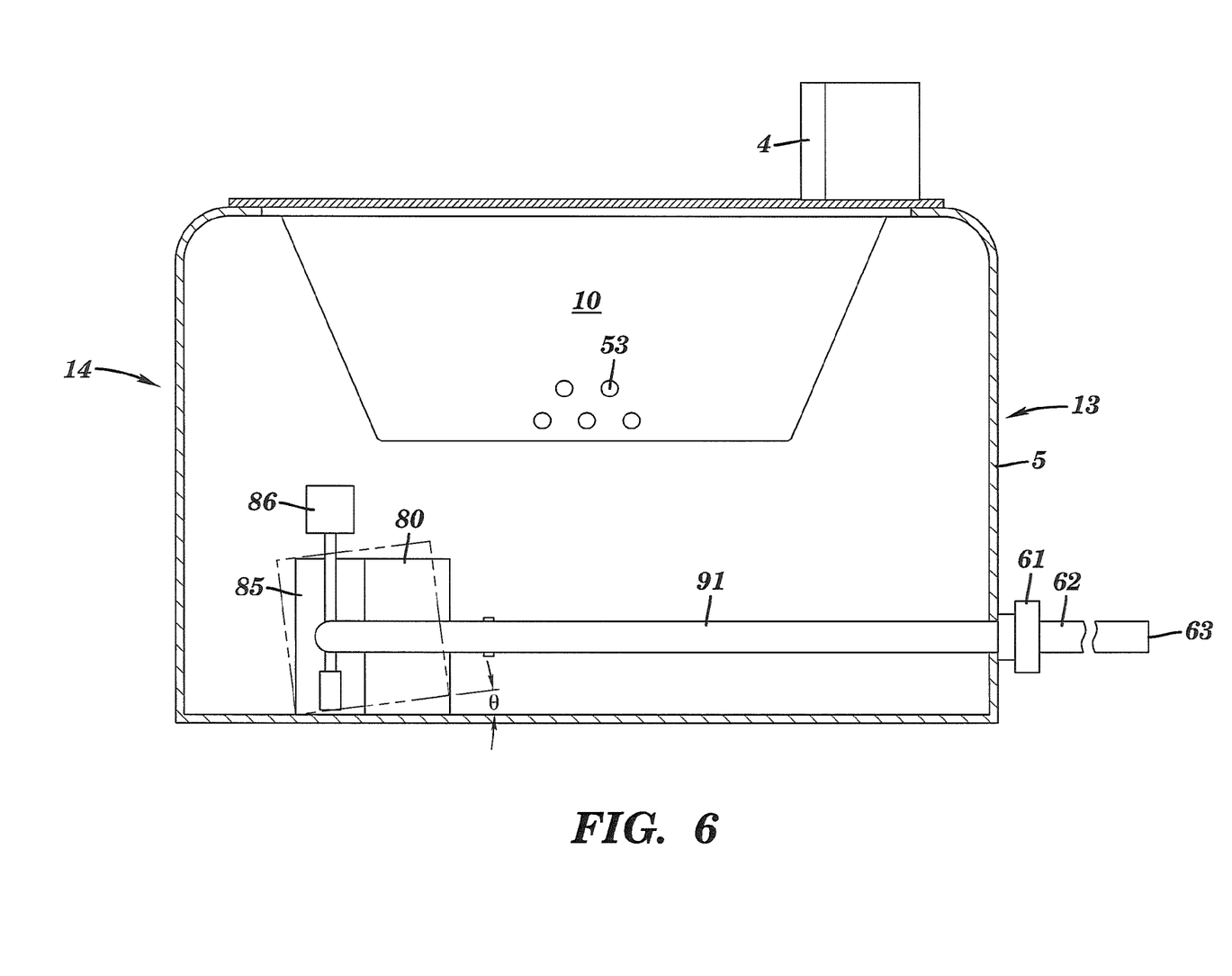
FIG. 6—depicts a side view of an embodiment of a watering device from the second compartment.
Figure 7:
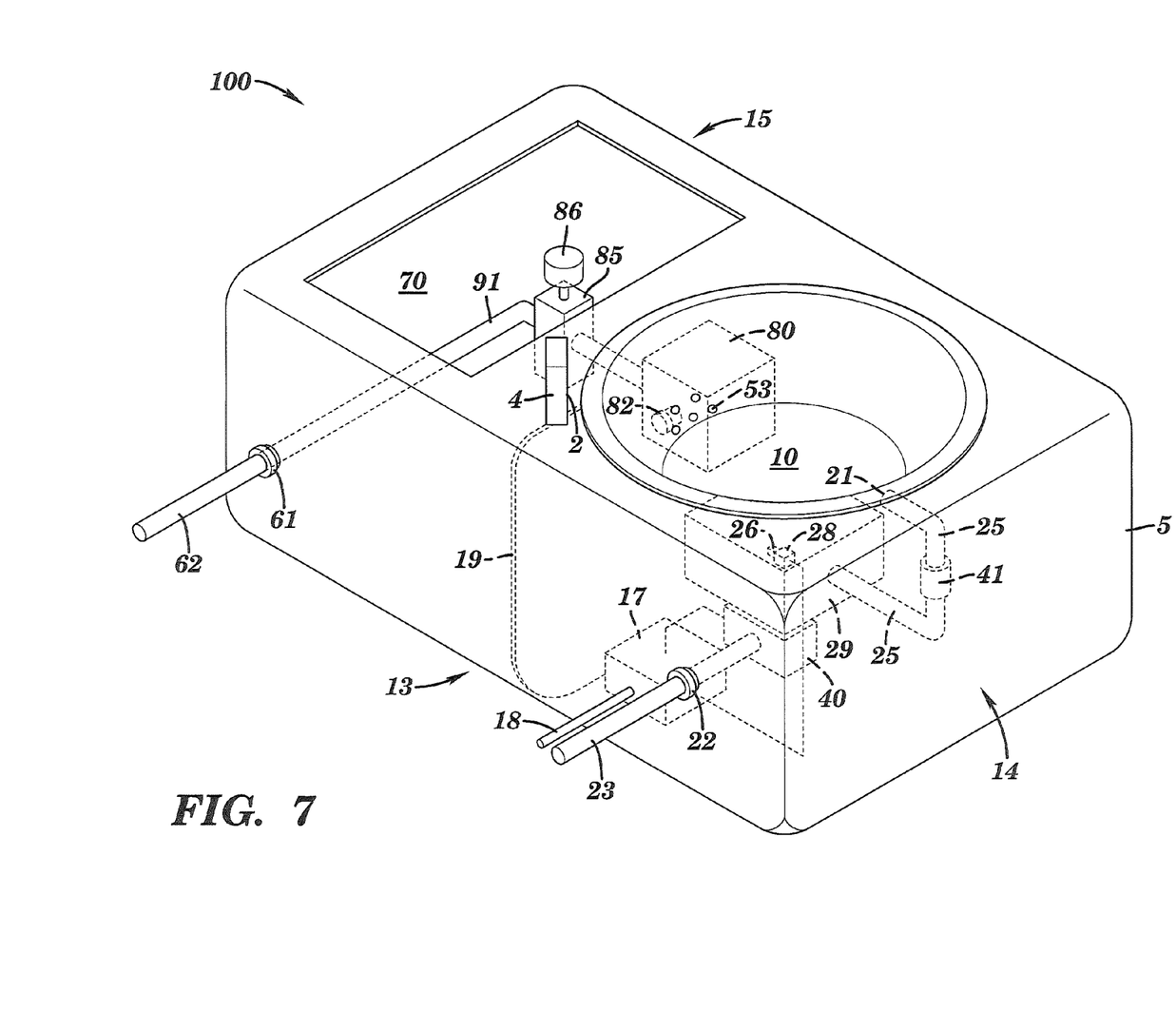
FIG. 7—depicts an isometric view of an embodiment of a watering device, with the outer shell being transparent.

FIG. 5 depicts an embodiment of watering device 100 having a safety bin 29 located proximate the bowl 10, wherein an at least one safety opening 27 allows the fluid to flow into safety bin. In one embodiment, the safety bin 29 may be located at or near the surface of the outer shell 5. In another embodiment, the safety bin 29 may be located a distance above the inlet opening 21. The safety bin 29 contains one or more safety openings 27 to allow the water to flow into the safety bin, and thus may prevent the bowl 10 from overflowing. Overflowing may occur when, inter alia, the drain opening 53 gets clogged such as when a pet may occasionally drop a piece of food into the bowl 10, or if a build up of hair collects in the bowl 10. If the drain opening 53 becomes clogged, the water level in the bowl 10 may rise because the bowl 10 is not continuously draining. If the water level in the bowl 10 reaches the level of the safety opening 27, the water may flow into the safety bin 29 through the safety opening 27. The safety bin 29 may temporarily retain the water. The safety bin 29 may house a safety float switch 28, which may have a safety float switch tip 26. The safety float switch tip 26 may be forced upward by the water level if the water level inside the safety bin 29 raises enough to engage the safety float switch tip 26. The safety float switch tip 26 may be positioned a height inside the safety bin 29 such that the water level inside the safety bin 29 may engage the safety float switch tip 26 before any water overflows out of the bowl 10. When the safety float switch tip 26 is in the engaged position, the float switch actuates the at least one solenoid valve 40 to a closed position, thus impeding the flow of water into the bowl 10 through the inlet opening 21. The safety bin 29 may be freely accessible or may have a removable cover flush with the outer shell 5. In one embodiment, the safety bin 29 may be located near the reservoir side of the bowl 10, allowing the retained water to flow directly into the reservoir 70 through a safety bin drain hole 32. The safety bin drain hole 32 may be located on the bottom surface of the safety bin 29, while the safety bin 29 is positioned somewhere above the reservoir 70.

Figure 9:
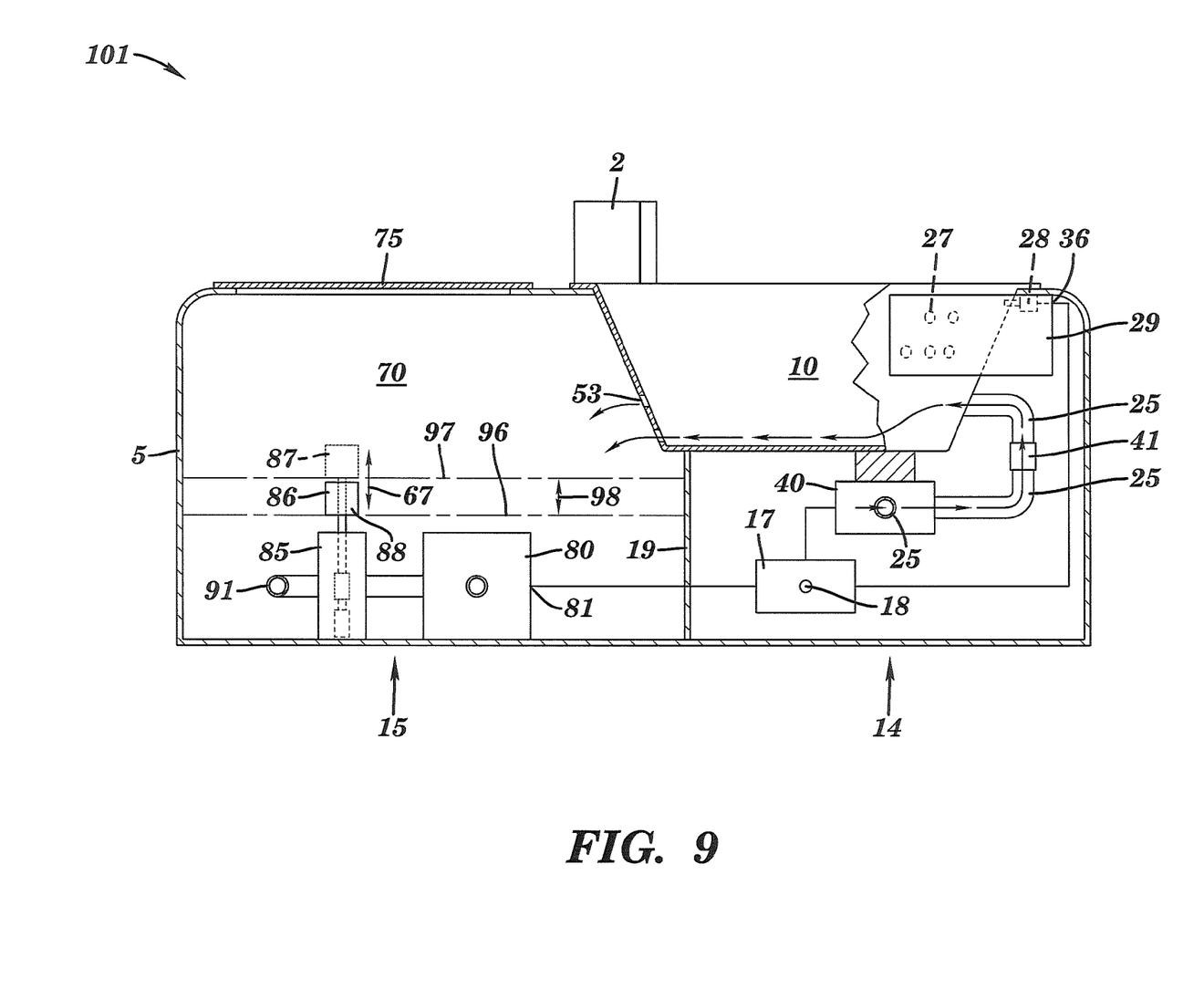
FIG. 9—depicts a cross sectional view, line end of an embodiment of a watering device in operation.

Referring now to FIG. 9, the first compartment 14 of the watering device 100 and the reservoir 70 side may be separated by a separation wall 19. The separation wall 19 may be located between the bowl 10 and the reservoir 70, and may have straight edges or curved edges. A portion of the surface of the bowl 10 may make up the separation wall 19. The separation wall 19 may create essentially two separate compartments, the reservoir 70, and a first compartment 16 housing the bowl 10, the solenoid valve 40, the sealed electronics module 17, the inlet line 25, and the safety bin 29. The separation wall 19 may create a water tight separation between the reservoir 70 and the first compartment 16, with the exception of the drain openings 53. The drain openings 53 may allow water or fluid to pass through the separation wall 19 and enter the reservoir 70.

With continued reference to FIG. 9, tracing the flow of water or fluid starts at the inlet supply line 23. The inlet supply line 23 may be attached or configured to receive water from an external supply. Once the external supply of water starts pumping or transporting water through the inlet supply line 23, the water may be transferred to the inlet line 25 which is housed within the first compartment 16. The water may flow through the inlet line into the solenoid valve 40. The flow of water may be impeded once it arrives at the solenoid valve 40. At this point, no water has entered the bowl 10. Once movement is detected by the sensor 2, the sensor 2 may trigger a transistor switch in communication with the solenoid valve 40, thus activating the solenoid valve 40 by switching it to an open position. The open position of a solenoid valve 40 allows water to pass through the solenoid valve 40 and back into inlet line 25, which may also be connected to the solenoid valve at a different location on the solenoid valve 40. The path of flow through the solenoid valve 40 is common among ordinary solenoid valves, and may be understood by those having ordinary skill in the art. The inlet line 25 may be connected to an inlet opening 21, which may then disperse the water through the inlet opening 21 and into the recessed area of the bowl 10.

The flow rate of the fluid as it enters the bowl through the inlet opening 21 may be approximately 0.5. liters per minute to 2.0 liters per minute. The flow rate may be controlled by varying the size of the inlet opening 21 and managing the inlet velocity of the fluid through the inlet line 25 and solenoid valve 40. The flow rate range may be important to the success of the self-filling and self-draining watering device 100 because an animal, such as a dog or cat, may be alarmed by a sudden gush of water into the bowl 10, or possible splashes of water that may rebound off the bottom surface of the bowl 10. The flow rate of the water may help allow the water entering from the inlet opening 21 to stay close the bottom surface of the bowl 10. For example, the water may enter the bowl 10 at a low velocity and low flow rate, such that the water may stream out of the inlet opening 21 and does not spout out of the inlet opening 21. The pet may consume the water by licking or slurping the bottom surface of the bowl 10, and to the pet, the bowl 10 is constantly full because as long as the sensor 2 detects the presence of the pet in front of the watering device 100, the solenoid valve 40 may remain in an open position, allowing water to continually enter the bowl 10, and flow along the bottom of the surface.

While the water may continually enter the bowl 10, the water may be continuously drained through one or more drain openings 53. Continuously draining the water from the bowl 10 may help to prevent animal saliva from caking on and building up on the surface of the bowl 10 because the saliva may not have a chance to settle at the bottom of the bowl (e.g. a normal bowl that does not self-fill or self-drain, has a pool of water where saliva can settle and sink the bottom). In addition to preventing saliva build-up, continuously draining water from the bowl 10 may help to prevent animal fur from collecting in the bowl. For example, some breeds of dogs shed frequently, even when consuming water, and the shedded fur may collect in the bowl 10, which may lead to dirty water, or a messy clean up for the pet owner.

Figure 10:
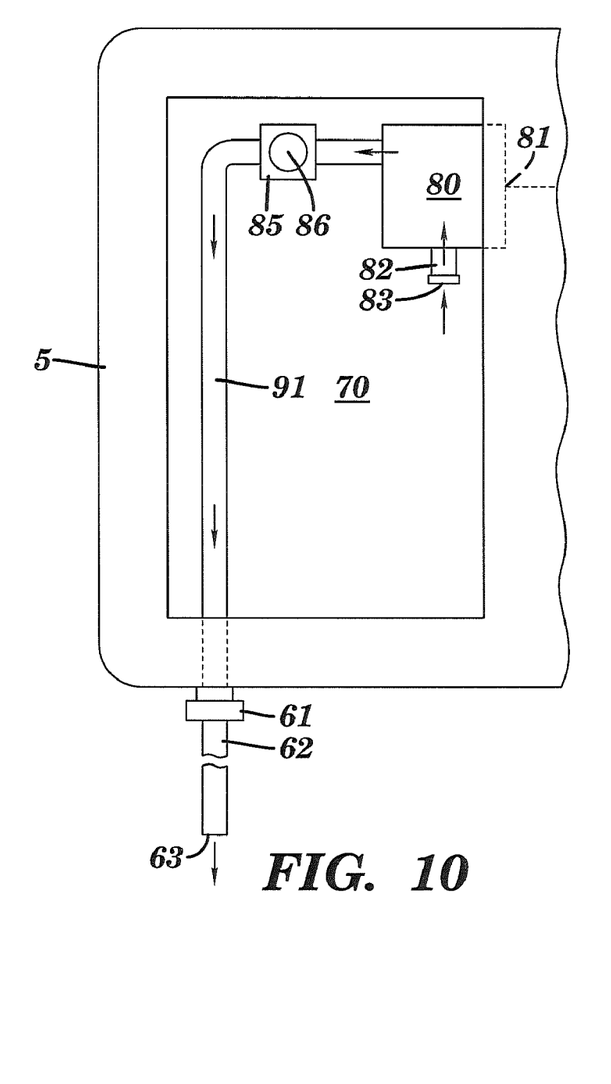
FIG. 10—depicts a top view of an embodiment of the second compartment of a watering device showing the path of fluid.
Figure 11:
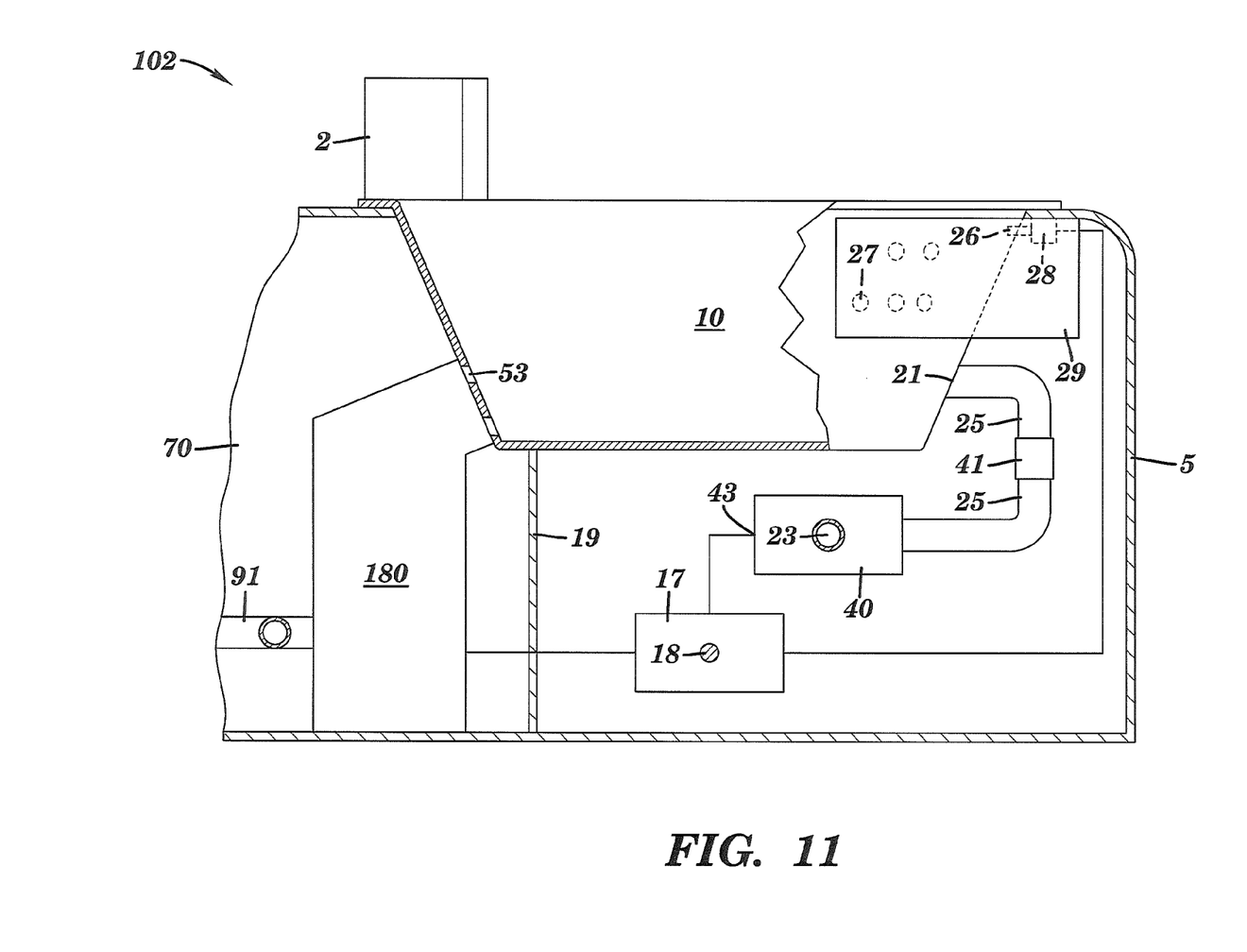
FIG. 11—depicts a cross-sectional view of an embodiment of the first compartment of a watering device with a pump attached directly to a bowl.
Figure 13:
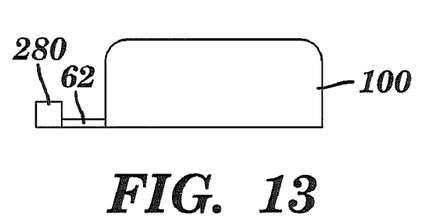
FIG. 13—depicts a schematic view of an embodiment of a watering device with a remote pump.
Figure 14:
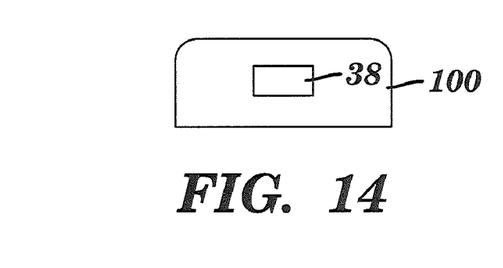
FIG. 14—depicts a schematic view of an embodiment of a watering device with a solar panel attached.
Figure 17:
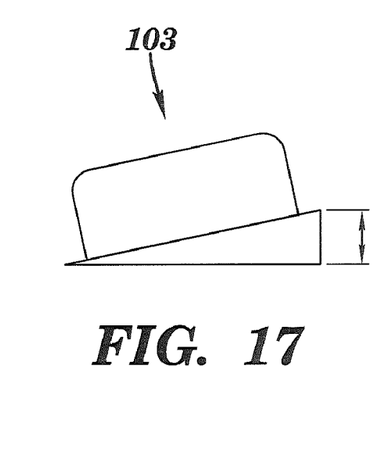
FIG. 17—depicts a front view of an embodiment of a watering device without a pump.

As the water continuously drains though the drain openings 53 into the reservoir 70, the water may be temporarily retained inside the reservoir 70. The water may accumulate in the reservoir 70 without engaging the float switch 85 or the pump 80. For example, water level 96 may represent a quantity of retained water inside the reservoir 70 without engaging the float switch 85 or the pump 80. As more water is drained into the reservoir 70, the water may accumulate to a water level somewhere between water level 96 and water level 97 which may contact the float switch tip 86, but not engage the float switch tip 86. At this water level, the pump 80 may or may not be submerged. Finally, after more water is drained into the reservoir 70, the water may accumulate to a water level 97, which may engage the float switch tip 86, and may push it into the second, engaged position 87. At this point, the pump may be submerged. When the float switch tip 86 in the second, engaged position 87, the float switch 85 may actuate the pump 80, which may begin intaking water through the pump intake 82. The water may travel into the pump intake 82, through the body of the pump 80, and may be transferred or dispersed into the drain line 91. The drain line 91 may carry the water toward the outer shell 5 of the watering device 100, wherein the drain may connect to an outlet line 62, as shown in FIG. 10. The water may then be carried by the outlet line 62 to its final discharge point 63. In an alternative embodiment, the pump 280 may be remote from the watering device 102, as depicted in FIG. 13. The self-filling and self-draining watering device 103 may not include a pump 80 if the watering device 103 is positioned on a slope, such that the bowl 10 is at a higher elevation than the reservoir 270, as depicted in FIG. 17. For example, the watering device 103 may be positioned at a downward angle sloping from the bowl 10 (high point) to the reservoir 70 (low point) such that the fluid entering the reservoir 70 may not retain the water (i.e. allow the water to accumulate, thus raising the water level in the reservoir 70). The fluid may then exit through a gravity discharge opening 66, using the forces of gravity to discharge the water from the reservoir 70.

Furthermore, the self-filling and self-draining watering device 100 may be powered by a low voltage wall adapter unit, similar to the type used on cordless phones, calculators, etc. The power may be connected using a 5 mm×2.1 mm female power receptacle. The outer shell 5 of the watering device 100 may house an electronics module 17. In one embodiment, the electronics module 17 may be located underneath the bowl 10. The electronics module 17 may house any electronic cords, circuits, connections, and electronic wires. Additionally, the electronics module 17 may be temporarily sealed while the watering device 100 is in operation, but may be accessed for repair and maintenance. The electronics module 17 may be any shape and size as to be able to fit inside the outer shell 5 of the watering device 100. In an alternative embodiment, the electronics may be wired throughout a vacancy between shell portions. For example, the outer shell 5 may consist of two shells, the outermost shell being slightly larger than the inner shell, creating a vacancy between the two shells to allow the placement of wires throughout the watering device 100. The electronics module 17 may be in communication with a power source connection 18 through standard electronic connections known to those having skill in the art. The power source connection 18 may be located somewhere on the surface of the outer shell 5. In one embodiment, the power source connection may be located on the surface of the outer shell 5 on the line end 13. The voltage used by the power source may be 12 vdc but may range from 6 vdc to 24 vdc. In one embodiment, high voltage (e.g. 120 vdc) may be employed. In another embodiment, battery power coupled with a built in charger may be used to power the device. Moreover, a small solar panel 38 could be placed somewhere on the outer shell 5 to charge a battery used to power the watering device 100.

The solenoid valve 40 may operate at low voltage, and the inlet line 25 may incorporate a ¼" ID inlet and a ⅜" outlet connection to the bowl 10. The solenoid may receive power through the solenoid valve power connection 43, located somewhere on the solenoid valve 40. Moreover, the inlet line 25 may use an integral 1 liter per minute flow washer. However, several voltage levels and several different inlet and outlet sizes may be used. Alternatively, the solenoid valve 40 may be mechanically operated instead of electrically, incorporating a motorized actuator to open and close, instead of a magnetic coil. Additionally, the safety float switch 28 may be mechanically operated, using a reed switch known to those having skill in the art. The safety float switch 28 may also function electronically with no moving parts. The safety float switch 28 may receive power through the safety float switch power connection 36. The sensor 2 may receive power through the sensor power connection 3, located somewhere on the sensor cover 4. The pump 80 may operate at a low voltage but may also operate at a high voltage (e.g. 120 vac). The pump 80 may receive power through the pump power connection 81. The float switch 85 may operate mechanically utilizing a reed switch. The float switch 85 may also operate electronically with no moving parts. In another embodiment, infrared or ultrasonic sensors may be used for both the pump 80 and safety float switch 28.

As depicted in FIG. 12, the watering device 100 may have a sensor 2 located remote from the water device (i.e. not mounted on the outer shell 5). In one embodiment, the sensor 2 may be mounted on a wall behind the watering device 100. In another embodiment, the sensor 2 may be located on a nearby object, pointing the front of the sensor 2 towards the watering device 100 such that it may detect movement towards the watering device 100. The sensor 2 may be mounted anywhere as long as it can detect movement towards the watering device 100. Alternatively, the sensor 2 may be incorporated into the inner surface of the bowl 10, as depicted in FIG. 16. The sensor 2 may be positioned in a water-tight container, which may be flush with the inner surface of the bowl 10, to detect movement towards the watering device.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

What is claimed is:

1. A pet-watering apparatus comprising:
   a first compartment having a bowl accepting a fluid from an inlet opening, wherein said fluid is continuously drained from said bowl through at least one drain opening of the bowl;
   a second compartment proximate said first compartment housing a reservoir in communication with the at least one drain opening, the reservoir temporarily retaining said continuously drained fluid;
   a pump to facilitate movement of said retained fluid through a drain line connected to an outlet line, the outlet line configured to discharge the fluid away from the reservoir to a final discharge point located external to the apparatus;

a float switch set to actuate said pump; and a sensor detecting a presence, wherein said presence detected by said sensor triggers a flow of said fluid to enter said bowl.

2. The apparatus of claim 1, wherein said bowl and said reservoir are encompassed by an outer shell.

3. The apparatus of claim 1, wherein said bowl forms a recessed area and contains the at least one drain opening, said recessed area containing the inlet opening to allow said fluid to flow through said inlet line from an inlet supply line.

4. The apparatus of claim 1, wherein a sealed module holding a plurality of electronic connections is located within an outer shell enclosing the first compartment and the second compartment, said sealed module in communication with a power device.

5. The apparatus of claim 1, wherein said drain line is connected to a plumbing system.

6. The apparatus of claim 1, wherein said sensor triggers a transistor switch to actuate a solenoid valve to allow a flow of said fluid to enter said bowl.

7. A pet-watering apparatus comprising:

an outer shell encompassing a bowl and a reservoir proximate said bowl, said bowl having a recessed area to accommodate a fluid flowing into said bowl through an inlet opening from an inlet line connected to an at least one solenoid valve to control a flow of said fluid into said bowl, said fluid being continuously drained into said reservoir through at least one drain opening positioned somewhere on a surface of said bowl, wherein said fluid is dispersed through an outlet positioned somewhere on a surface of said reservoir;

an inlet supply line configured to connect to a fluid supply to introduce said fluid into said bowl through said inlet line;

a pump in operable communication with said reservoir to facilitate discharge of said fluid;

a sensor mounted on said outer shell that triggers a transistor switch to activate said at least one solenoid valve to allow the flow of said fluid from said fluid supply;

a switch in communication with said pump to discharge said fluid through a drain line connected to said pump;

an outlet line connected to said drain line to carry said fluid from said reservoir to a final discharge point external to the outer shell;

a safety bin located proximate said bowl, wherein an at least one safety opening allows said fluid to flow into said safety bin, said safety bin housing a safety device switch; and a sealed module located within the outer shell, containing a plurality of electric wires and at least one power cord, said sealed module receiving power from a power source.

8. The drain line of claim 7, wherein said final discharge point is connected to a main plumbing system.

9. The apparatus of claim 7, wherein said reservoir is concealed with a removably attached lid cover.

10. The apparatus of claim 7, wherein said bowl has a perforated cover.

11. The apparatus of claim 7, wherein said inlet supply line has an inline check valve to prevent backflow.

12. The apparatus of claim 7, wherein said outlet line has an in line check valve to prevent backflow.

13. The apparatus of claim 7, wherein said pump is located remote from said reservoir.

14. The apparatus of claim 7, wherein said pump is directly connected to said drain openings.

15. The apparatus of claim 7, wherein said sensor is located remotely.

16. The apparatus of claim 7, wherein said flow of fluid is approximately 0.5-2 liters per minute.

17. The apparatus of claim 7, wherein said power source includes AC, DC, or solar energy.

18. The apparatus of claim 17, wherein said power source ranges from 12 vdc to 120 vac.

19. The apparatus of claim 7, wherein said sensor is an infrared reflective sensor.

20. The apparatus of claim 7, wherein said sensor is an infrared beam detector.

21. The apparatus of claim 7, wherein said sensor is an ultrasonic sensor.

22. A method of an animal providing water for itself comprising:

providing an apparatus having a first compartment and a reservoir, said first compartment houses a bowl, an at least solenoid valve, a sealed electronics module, and an inlet line, said reservoir in communication with a pump and operable with a switch, wherein said switch actuates said pump to discharge said fluid out of said reservoir;

attaching an inlet supply line to a fluid supply;

connecting said inlet supply line to an inlet line which transports said fluid through an inlet opening to enter said bowl;

draining said fluid continuously through an at least one drain opening located on a surface of said bowl into said reservoir;

discharging said fluid from said reservoir to a final discharge point located external to the apparatus, wherein said pump facilitates discharge of said fluid through a drain line;

providing a sensor to activate at least one solenoid valve to allow a flow of said fluid into said bowl;

activating an inlet supply when an animal triggers said sensor;

providing a connection to a powering device; and enclosing said bowl and said reservoir in an outer shell.

23. The method of 22, wherein said drain line is connected to an outlet line which leads to the final discharge point.

24. The method of claim 23, wherein said final discharge point is at least one of a main plumbing system, sump pit, kitchen sink, and any area outdoors.

25. The method of claim 22, wherein said safety bin is located proximate said bowl, further wherein said safety bin has an at least one safety opening and houses a safety float switch.

* * * * *